United States Patent [19]
Marko et al.

[11] Patent Number: 5,329,555
[45] Date of Patent: Jul. 12, 1994

[54] METHOD AND APPARATUS FOR ANTENNA DIVERSITY IN A WIRELESS COMMUNICATION SYSTEM

[75] Inventors: Paul Marko, Ft. Lauderdale; Craig Wadin, Sunrise; Gary S. Lobel, Boynton Beach, all of Fla.

[73] Assignee: Motorola, Inc., Schaumburg, Ill.

[21] Appl. No.: 941,587

[22] Filed: Sep. 9, 1992

[51] Int. Cl.⁵ .......................... H04B 7/10; H04L 1/02
[52] U.S. Cl. ..................................... 375/100; 375/27; 455/277.1
[58] Field of Search ........................ 375/27, 82, 100; 455/272, 275, 277.1, 277.2; 342/432

[56] References Cited

U.S. PATENT DOCUMENTS

| | | | |
|---|---|---|---|
| 4,742,568 | 5/1988 | Furuya | 455/277 |
| 4,752,941 | 6/1988 | Takahara et al. | 375/100 |
| 4,756,023 | 7/1988 | Kojima | 455/134 |
| 4,876,743 | 10/1989 | Lindenmeier et al. | 455/275 |
| 5,239,541 | 8/1993 | Murai | 375/100 |

FOREIGN PATENT DOCUMENTS

0419674A1 3/1991 European Pat. Off. .

Primary Examiner—Stephen Chin
Assistant Examiner—Don Vo
Attorney, Agent, or Firm—R. Louis Breeden; Thomas G. Berry

[57] ABSTRACT

The present invention comprises a method and apparatus for selecting one of at least two antennas (202, 204) in a communication unit (102) for use in a wireless communication system (100). A signal is received by a radio frequency receiver (208) during a receiving period from one of the at least two antennas (202, 204) currently selected by an antenna switch (206), the signal transmitted in a digital communications format comprising a plurality of valid data patterns and having an invalid data pattern that is not transmitted. The number of data patterns in the signal received that comprise the invalid data pattern is determined by an antenna diversity control circuit (222), and for a subsequent receiving period one of the at least two antennas (202, 204) is selected based upon the number of occurrences of the invalid data pattern determined.

17 Claims, 2 Drawing Sheets

METHOD AND APPARATUS FOR ANTENNA DIVERSITY IN A WIRELESS COMMUNICATION SYSTEM

FIELD OF THE INVENTION

This invention relates in general to wireless communication systems, and more specifically to a method and apparatus for performing antenna diversity in a wireless communication receiver.

BACKGROUND OF THE INVENTION

Two-way mobile communication receivers that support antenna diversity for overcoming some symptoms of multipath fading in a mobile environment are well known in the art. Examples of such receivers may be found in cellular mobile telephone systems. Other examples of such receivers may be found in systems such as those based on second generation digital cordless telephony (CT2) technology.

Some conventional single-front-end analog radio communication receivers that supported antenna diversity made decisions about which antenna should be used based upon received signal strength. That is, whenever the received signal strength fell below a predetermined level, the receiver switched to a different antenna. Conventional CT2 digital communication transceivers that support antenna diversity made decisions about which antenna to use based upon either received signal strength or detected checksum errors.

Unfortunately, there are drawbacks to using received signal strength as a trigger for switching antennas. The drawback results from the effects of delay dispersion caused by selective multipath reflections of signals, and from interference signals. Both delay dispersion and interference signals can comprise substantial amounts of received signal strength, thus "fooling" antenna diversity trigger mechanisms based on received signal strength. This can cause a diversity system to remain coupled to a current antenna selection, when switching to an alternate antenna would likely produce better results.

Using detected checksum errors as a trigger for switching antennas can overcome the aforementioned drawback associated with received signal strength, but introduces a new problem. The new problem results from the amount of time it can take to detect an error. For example, during user communications in the CT2 system, a forty to eighty millisecond period is required to detect a checksum error in a relatively slow signaling data stream that accompanies the user communications. The possible loss of user communications for a corresponding forty to eighty milliseconds before switching to a better antenna can be very objectionable to the user.

Thus, what is needed is a way of controlling antenna diversity that performs well even in the presence of delay dispersion and interference, and that performs quickly enough to switch antennas before a degrading signal can cause an objectionable loss of user communications.

SUMMARY OF THE INVENTION

One aspect of the present invention comprises a method for selecting one of at least two antennas in a communication unit for use in a wireless communication system. The method comprises the steps of:

(a) receiving during a receiving period a signal from a currently selected one of the at least two antennas, the signal transmitted in a digital communications format comprising a plurality of valid data patterns and an invalid data pattern that is not transmitted;

(b) determining the number of data patterns in the signal received in step (a) that comprise the invalid data pattern; and (c) selecting for a subsequent receiving period one of the at least two antennas in response to the number of invalid data patterns determined in step (b).

Another aspect of the present invention comprises an apparatus for selecting one of at least two antennas in a communication unit for use in a wireless communication system. The apparatus includes a receiver for receiving a signal from a currently selected one of the at least two antennas, the signal comprising a digital communications format comprising a plurality of valid data patterns and an invalid data pattern that is not transmitted. A switch coupled to the receiver and to the at least two antennas couples the currently selected one of the at least two antennas to the receiver means. An invalid data pattern detector coupled to the receiver detects the invalid data pattern in the signal received, and a counter coupled to the invalid data pattern detector determines a count of the invalid data patterns detected in a current receiving period. A selector coupled to the switch and to the counter selects for a subsequent receiving period one of the at least two antennas in response to a count of occurrences of the invalid data pattern.

Another aspect of the present invention comprises a communication unit for use in a wireless communication system, the communication unit comprising an apparatus for selecting one of at least two antennas. The apparatus includes a receiver for receiving a signal from a currently selected one of the at least two antennas, the signal comprising a digital communications format comprising a plurality of valid data patterns and an invalid data pattern that is not transmitted. A switch coupled to the receiver and to the at least two antennas couples the currently selected one of the at least two antennas to the receiver means. An invalid data pattern detector coupled to the receiver detects the invalid data patterns in a signal received, and a counter coupled to the invalid data pattern detector determines a count of the invalid data patterns detected in a current receiving period. A selector coupled to the switch and to the counter selects for a subsequent period one of the at least two antennas in response to a count of occurrences of the invalid data pattern.

DESCRIPTION OF THE PREFERRED EMBODIMENT

Figure 1:
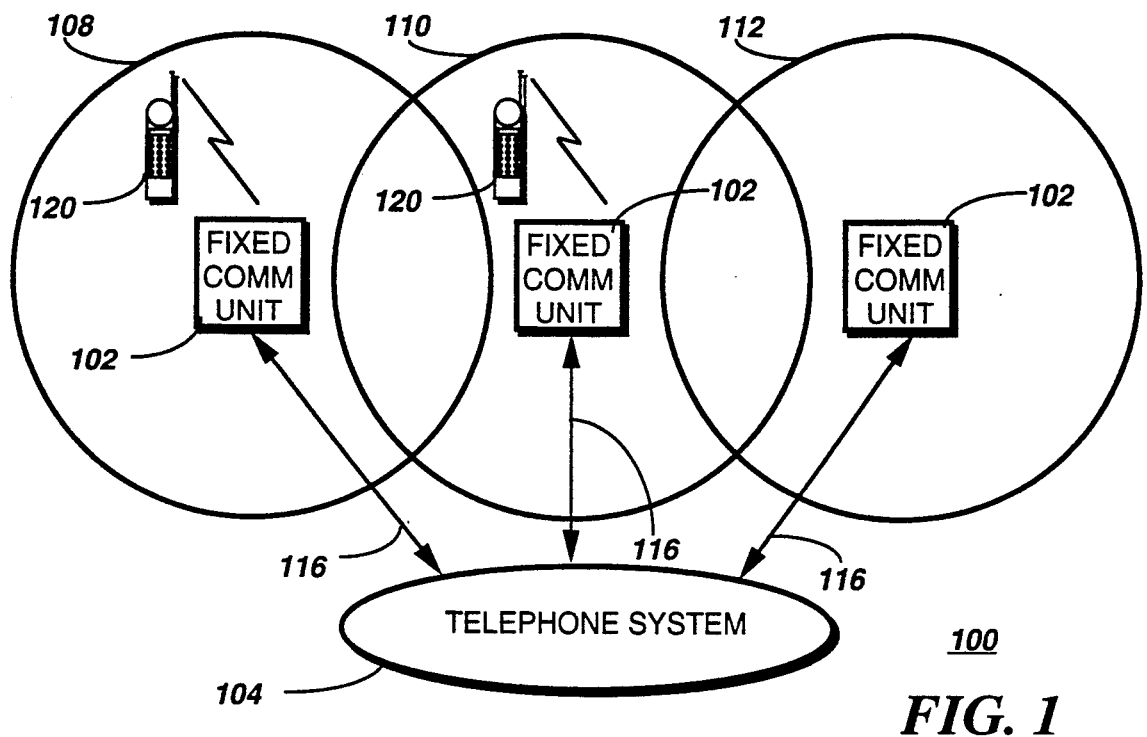
FIG. 1 is an electrical block diagram of a wireless communication system in accordance with the preferred embodiment of the present invention.

With reference to FIG. 1, an electrical block diagram of a wireless communication system 100 in accordance with the preferred embodiment of the present invention comprises a plurality of fixed communication units 102 coupled to a telephone system 104, e.g., a private branch exchange (PBX) or a Public Switched Telephone Network (PSTN). The fixed communication units 102 provide wireless communication coverage within coverage areas 108, 110, 112 for portable communication units 120. The coupling between the fixed communication units 102 and the telephone system 104 is performed by telephone lines 116 for transporting user communications between the portable communication units 120 and the telephone system 104.

Figure 2:
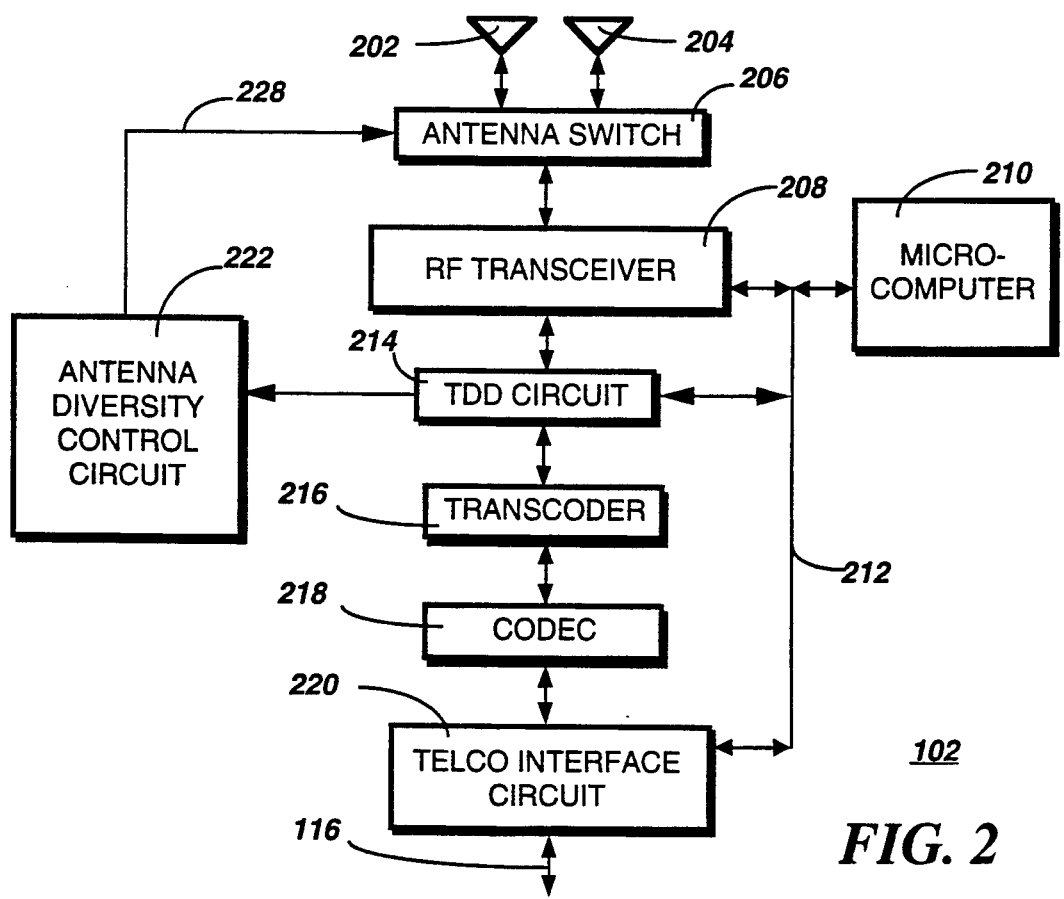
FIG. 2 is an electrical block diagram of a fixed communication unit in accordance with the preferred embodiment of the present invention.

With reference to FIG. 2, an electrical block diagram of the fixed communication unit 102 in accordance with the preferred embodiment of the present invention comprises first and second antennas 202, 204 coupled to an antenna switch 206. The first and second antennas 202, 204 preferably are sufficiently separated in space to provide reception diversity, so that the antenna switch 206 may be controlled as described herein below to select the first or second antenna 202, 204 intercepting the better signal at a particular instant of time. The antenna switch 206 is coupled to a radio frequency (RF) transceiver 208 for transmitting communication signals to and receiving communication signals from the antenna switch 206. The RF transceiver 208 is coupled to a microcomputer 210 comprising stored program control for controlling the RF transceiver 208 by a bus 212. The RF transceiver 208 is coupled to a time-division-duplex (TDD) circuit 214 for converting between TDD signaling of the RF transceiver 208 and space-division-duplex signaling of a transcoder 216. Preferably, the TDD circuit 214 performs compatibly with the second generation cordless telephony (CT2) TDD transmit and receive intervals of one millisecond each, although other TDD transmit and receive intervals could be used as well. The transcoder 216 is coupled to the TDD circuit 214 for converting between adaptive differential pulse code modulation (ADPCM) signaling of the TDD circuit 214 and pulse code modulation (PCM) signaling of a coder/decoder (CODEC) 218 coupled to the transcoder 216 for converting between the digital PCM signaling of the transcoder 216 and the analog signaling of a telephone company (TELCO) interface circuit 220. The TELCO interface circuit 220 is coupled to the CODEC for providing well-known telephone interface functions such as line supervision, incoming call detection, telephone address signaling, etc. The TELCO interface circuit 220, the transcoder 216, and the TDD circuit 214 are coupled to the bus 212 for control by the microcomputer 210.

In addition, the TDD circuit 214 is coupled to an antenna diversity control circuit 222 for providing timing and data signals to the antenna diversity control circuit 222. The antenna diversity control circuit 222 is coupled to the antenna switch 206 by a control line 228 for controlling the antenna switch 206 to select the first or second antenna 202, 204 having the better signal at a particular instant of time in accordance with the present invention.

Except for the antenna switch 206 and the antenna diversity control circuit 222, all the blocks included in the fixed communication unit 102 of FIG. 2 are available in the S35XGB1602AP telepoint base station currently manufactured by Motorola, Inc. of Schaumburg, Ill. Antenna switches are well-known in the art, an example being the model P35-4215-0 antenna switch manufactured by Daico Industries, Inc. of Rancho Dominguez, Calif.

Operation of the antenna diversity control circuit 222 in accordance with the present invention is based upon a special characteristic of thirty-two kbps ADPCM signaling. The special characteristic exists because thirty-two kbps ADPCM signaling comprises a four-bit word structure capable of sixteen different bit combinations, but only fifteen of the possible sixteen bit combinations are used. The combination 0000 is never transmitted. Still, transmission errors, e.g., errors occurring from an antenna entering a signal null, can cause the combination 0000 to be received. According to the present invention, the antenna diversity control circuit 222 monitors a stream of received ADPCM code words, specifically searching for the combination 0000. If the combination 0000 is found, the antenna diversity control circuit 222 presumes the combination to be the result of a transmission error and takes appropriate action, as described herein below.

Figure 3:
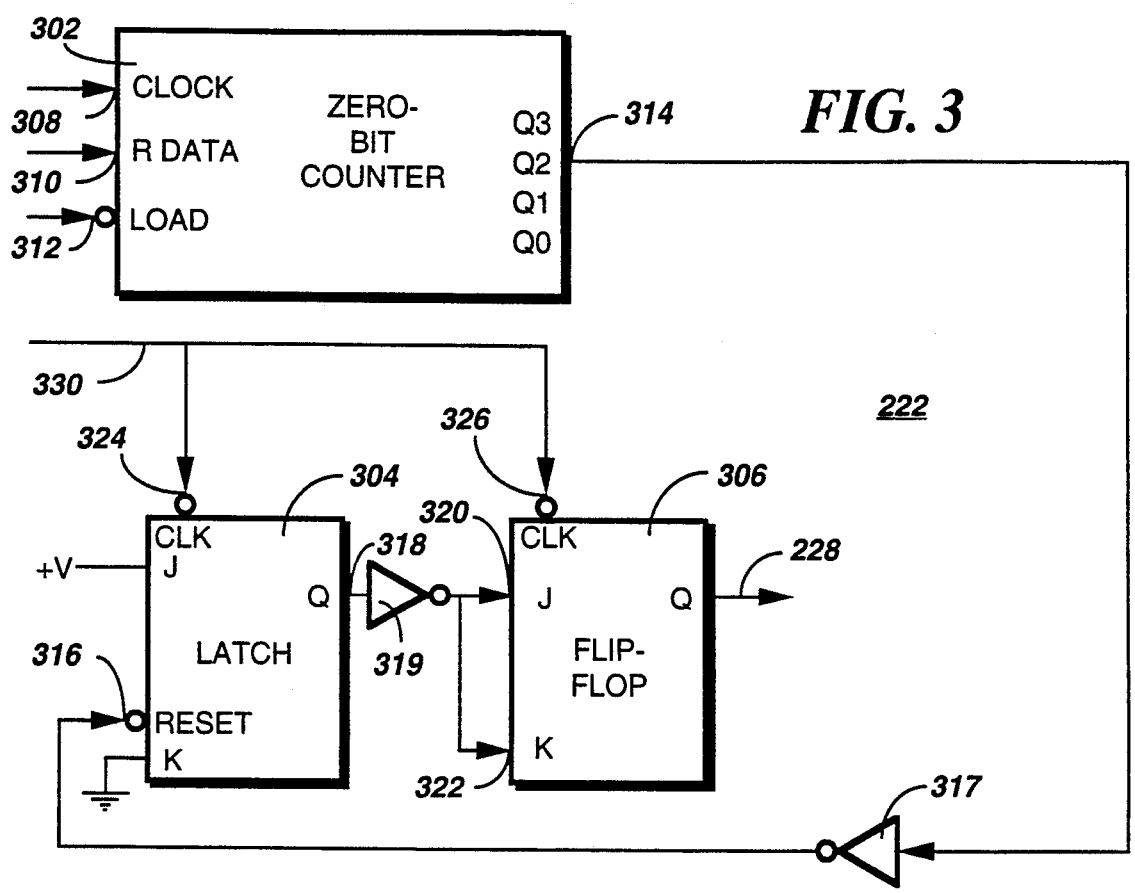
FIG. 3 is an electrical block diagram of an antenna diversity control circuit in accordance with the preferred embodiment of the present invention.

With reference to FIG. 3, an electrical block diagram of the antenna diversity control circuit 222 in accordance with the preferred embodiment of the present invention comprises a zero-bit counter 302 for detecting an occurrence of an ADPCM word comprising a value of 0000. The zero-bit counter 302 receives a clock signal from the TDD circuit 214 (FIG. 2) at a clock input 308. The zero-bit counter 302 also receives a received data signal from the TDD circuit 214 at a received data input 310. In addition, the zero-bit counter 302 has a load input 312, which receives a continuous sample alignment signal from the TDD circuit 214 during each ADPCM time slot for sending a four-bit ADPCM word. The sample alignment signal at the load input 312 resets and enables the zero-bit counter 302 to count zero bits arriving from the TDD circuit 214 at the received data input 310. If the zero-bit counter 302 receives an ADPCM value of 0000 at the received data input 310, the zero-bit counter 302 will reach a count of four, thus enabling the Q2 output 314 to provide an indication that an invalid all-zero ADPCM word has occurred.

The Q2 output 314 is coupled through an inverter 317 to a reset input 316 of a latch 304 for latching the invalid word indication at a latch output 318. Once the zero bit counter 302 has detected at least one all-zero ADPCM word during a current TDD receive interval, the latch output 318 will remain low until the end of the current TDD receive interval. This occurs because a clock input 324 of the latch 304 receives a signal from the TDD circuit 214 (FIG. 2) on a line 330 that sets the latch by transitioning from a high logic level to a low logic level at the end of each TDD receive interval. Thus, only at the end of the current TDD receive interval will the latch 304 remove the low logic level at the latch output 318.

The signal present on the line 330 is also coupled to a clock input 326 of a flip-flop 306. When this signal goes low at the end of the current TDD receive interval, the flip-flop output signal available on the control line 228 will toggle if the latch output 318 is low (indicating invalid data received), thus toggling the antenna switch 206 (FIG. 2). If, on the other hand, the latch output 318 is high (indicating no invalid data received) when the signal on the line 330 goes low, then the flip-flop 306 and the antenna switch 206 will not toggle. These responses occur because the latch output 318 is coupled to J and K inputs 320, 322 of the flip-flop 306 through an inverter 319.

It is important to note that when a signal received from the first or second antenna 202, 204 degrades sufficiently that data errors begin to be incurred, the ADPCM code word 0000 does not automatically and mysteriously accompany every error. Random errors have an equal probability of generating any of the fifteen valid four-bit ADPCM code words as well as the invalid code word 0000. Thus, the probability that any errored code word will be received as the invalid code word 0000 is 1/16. For this reason, when errors do begin occurring, several code words typically must be received before the invalid code word 0000 occurs and can be detected. Still, because an ADPCM code word arrives from the TDD circuit 214 every 125 microseconds, it normally does not take very long to begin detecting errors. Typical response times empirically measured for the antenna diversity control circuit 222 in accordance with the preferred embodiment of the present invention have ranged from one to six milliseconds—a substantial improvement over conventional checksum error detection methods that require forty to eighty milliseconds.

Thus, the present invention comprises a method and apparatus for controlling antenna diversity in response to detecting a single invalid ADPCM code word. The present invention provides an antenna diversity controller that performs well even in the presence of delay dispersion and interference, and that performs quickly enough to switch antennas before a degrading signal can cause an objectionable loss of user communications.

Figure 4:
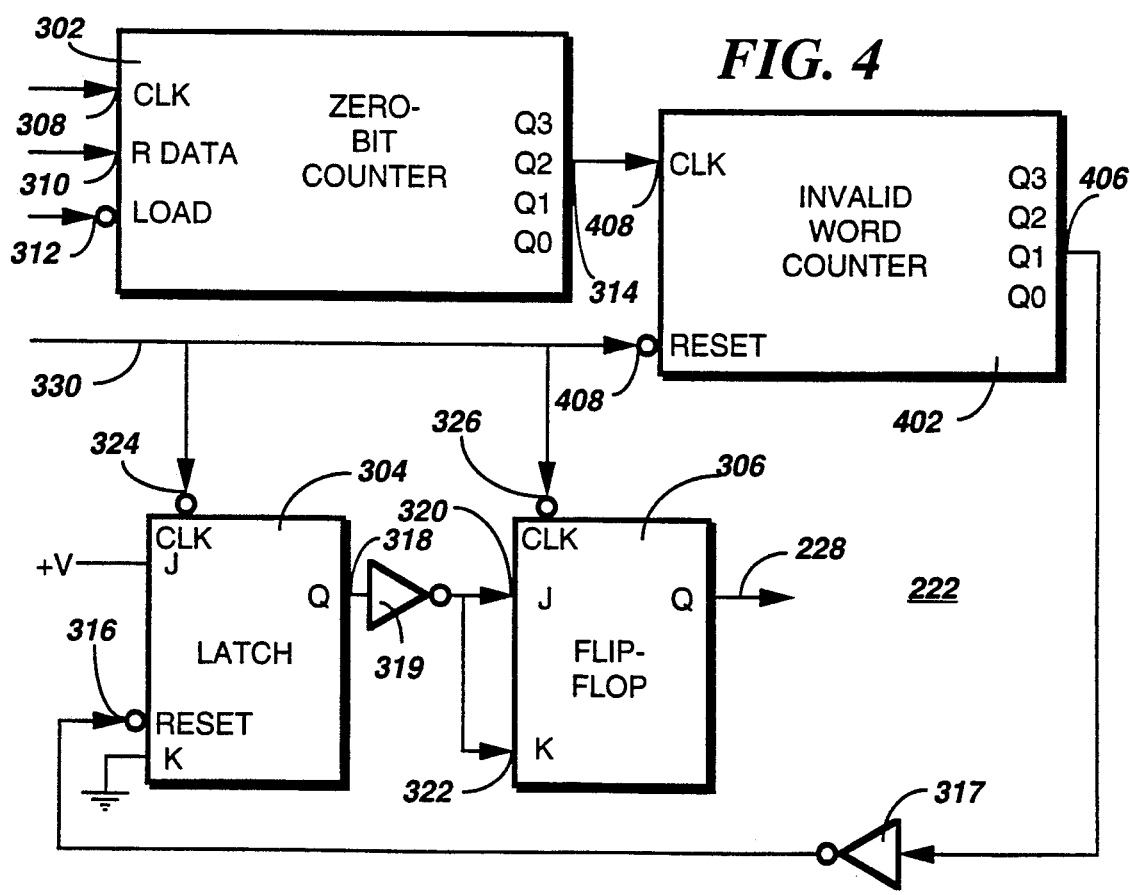
FIG. 4 is an electrical block diagram of the antenna diversity control circuit in accordance with an alternate embodiment of the present invention.

With reference to FIG. 4, an electrical block diagram of the antenna diversity control circuit 222 in accordance with an alternate embodiment of the present invention is substantially similar to the electrical block diagram of FIG. 3, the essential difference being the addition of an invalid word counter 402. A clock input 408 of the invalid word counter 402 is coupled to the Q2 output 314 of the zero bit counter 302. A Q1 output 406 is coupled to the reset input 316 of the latch 304 through the inverter 317. This arrangement prevents resetting of the latch 304 and resultant antenna switching unless the invalid word counter 402 reaches a count of two, i.e., after two invalid ADPCM words occur during a single TDD receive interval.

Other outputs and combinations of outputs of the invalid word counter 402 could be used as well to cause antenna switching after other pre-determined invalid word counts, such as a count of four when the Q2 output is used. The signal from the line 330 is coupled to a reset input 408 of the invalid word counter 402 to reset the invalid word counter to a count of zero at the end of each TDD receive interval, so that the invalid word counter 402 will be ready to count invalid ADPCM words in the next TDD receive cycle.

Preferably the components used for constructing the antenna diversity control circuit 222 are as follows:

| | |
|---|---|
| the zero bit counter 302 | 74HC163 |
| the invalid word counter 402 | 74HC163 |
| the latch 304 | 74HC112 |
| the flip-flop 306 | 74HC112 |
| the inverters 317, 319 | 74HC04A. |

The components listed above are available from Motorola, Inc. of Schaumburg, Ill.

One of ordinary skill in the art will recognize that other components and circuit architectures may be used as well to construct alternate embodiments of the present invention. For example, one might want to increase the probability of reaching a pre-determined trigger level for switching antennas. This would be possible with a slight increase in circuit complexity by counting the number of invalid code words received during a pre-determined number of TDD receive intervals instead of resetting the invalid word counter 402 at the end of each TDD receive interval, as was described herein above.

Thus, the present invention not only comprises a method and apparatus for switching to a different antenna in response to detecting a single invalid ADPCM code word, but also provides the ability for switching in response to detecting a pre-determined number of invalid ADPCM code words. This ability allows an adjustment of the sensitivity of the antenna diversity control circuit 222 to prevent unnecessary antenna switching in the presence of an occasional isolated invalid code word, for example, at the expense of a somewhat longer response time.

We claim:

1. A method for selecting one of at least two antennas in a communication unit for use in a wireless communication system, the method comprising the steps of:
   (a) receiving during a receiving period a signal from a currently selected one of the at least two antennas, the signal transmitted in a digital communications format comprisig a plurality of valid data patterns and an invalid data pattern that is not transmitted;
   (b) determining the number of data patterns in the signal received in step (a) that comprise the invalid data pattern; and
   (c) selecting for a subsequent receiving period one of the at least two antennas in response to the number of invalid data patterns determined in step (b).

2. The method in accordance with claim 1, wherein step (c) further comprises the steps of:
   (d) selecting for a subsequent receiving period the same one of the at least two antennas currently selected, when determined in step (c) that the signal contains less than a pre-determined number of occurrences of the invalid data pattern; and
   (e) selecting for a subsequent receiving period another one of the at least two antennas different from the antenna currently selected, when determined in step (c) that the signal contains at least a pre-determined number of occurrences of the invalid data pattern.

3. The method in accordance with claim 1, further comprising the steps of:
   (d) transmitting and receiving on a single transmission channel in a time-division-duplex manner; and
   (e) selecting for a subsequent transmitting period the one of the at least two antennas currently selected for the subsequent receiving period.

4. The method in accordance with claim 1, wherein
   the signal is an adaptive differential pulse code modulation (ADPCM) signal, and
   wherein step (b) comprises the step of:

(d) determining the number of all-zero-bit patterns in the ADPCM signal, and wherein step (c) comprises the step of:

(e) selecting for a subsequent receiving period one of the at least two antennas based upon the number of all-zero-bit patterns in the ADPCM signal determined in step (d).

5. The method in accordance with claim 4, wherein step (e) comprises the steps of:

(f) selecting for a subsequent receiving period the same one of the at least two antennas currently selected, when determined in step (d) that the ADPCM signal contains less than a pre-determined number of all-zero-bit patterns, and (g) selecting for a subsequent receiving period another one of the at least two antennas different from the antenna currently selected, when determined in step (d) that the ADPCM signal contains at least a pre-determined number of all-zero-bit patterns.

6. The method in accordance with claim 5, wherein step (f) comprises the step of:

(b) selecting for a subsequent receiving period the same one of the at least two antennas currently selected, when determined in step (d) that the ADPCM signal contains less than one all-zero-bit pattern; and wherein step (g) comprises the step of:

(i) selecting for a subsequent receiving period another one of the at least two antennas different from the antenna currently selected, when determined in step (d) that the ADPCM signal contains at least one all-zero-bit pattern.

7. The method in accordance with claim 5, further comprising the steps of:

(h) transmitting and receiving on a single transmission channel in a time-division-duplex manner; and (i) selecting for a subsequent transmitting period the one of the at least two antennas currently selected for the subsequent receiving period.

8. An apparatus for selecting one of at least two antennas in a communication unit for use in a wireless communication system, the apparatus comprising:

receiver means for receiving a signal from a currently selected one of the at least two antennas, the signal comprising a digital communications format comprising a plurality of valid data patterns and an invalid data pattern that is not transmitted;

switch means coupled to the receiver means and to the at least two antennas for coupling the currently selected one of the at least two antennas to the receiver means;

invalid data pattern detection means coupled to the receiver means for detecting the invalid data pattern in the signal received; and selector means coupled to the switch means and to the invalid data pattern detection means for selecting for a subsequent period one of the at least two antennas in response to a count of occurrences of the invalid data pattern.

9. The apparatus in accordance with claim 8, further comprising:

counter means coupled to the invalid data pattern detection means and to the selector means for determining the count detected in a current receiving period and effecting antenna selection in response to reaching a pre-determined count.

10. The apparatus in accordance with claim 8, further comprising:

transmitter means for transmitting the signal comprising the digital communications format; and time division duplex means coupled to the transmitter means and to the receiver means for transmitting and receiving on a single transmission channel in a time-division-duplex manner.

11. The apparatus in accordance with claim 8, wherein the the signal is an adaptive differential pulse code modulation (ADPCM) signal.

12. The apparatus in accordance with claim 11, wherein the invalid data pattern comprises an all-zero-bit pattern.

13. A communication unit for use in a wireless communication system, the communication unit comprising an apparatus for selecting one of at least two antennas, the apparatus comprising:

a receiver for receiving a signal from a currently selected one of the at least two antennas, the signal comprising a digital communications format comprising a plurality of valid data patterns and an invalid data pattern that is not transmitted;

a switch coupled to the receiver and to the at least two antennas to the receiver;

an invalid data pattern detector coupled to the receiver for detecting the invalid data pattern in the signal received; and a selector coupled to the switch and to the invalid data pattern detector for selecting for a subsequent period one of the at least two antennas in response to a count of occurrences of the invalid data pattern.

14. The communication unit in accordance with claim 13, further comprising:

a counter coupled to the invalid data pattern detector and to the selector for determining the count detected in a current receiving period and effecting antenna selection in response to reaching a pre-determined count.

15. The communication unit in accordance with claim 13, further comprising:

a transmitter for transmitting the signal comprising the digital communications format on the one of the at least two antennas selected for a subsequent period; and a time division duplex element coupled to the transmitter and to the receiver for transmitting and receiving the signal comprising the digital communications format on a single transmission channel in a time-division-duplex manner.

16. The communication unit in accordance with claim 13, wherein the signal is an adaptive differential pulse code modulation (ADPCM) signal.

17. The communication unit in accordance with claim 16, wherein the invalid data pattern comprises an all-zero-bit pattern.

* * * * *

UNITED STATES PATENT AND TRADEMARK OFFICE
CERTIFICATE OF CORRECTION

PATENT NO. : 5,329,555
DATED : July 12, 1994
INVENTOR(S) : Marko et al.

It is certified that error appears in the above-indentified patent and that said Letters Patent is hereby corrected as shown below:

Column 6, line 34, after "format" delete "comprisig" and insert --comprising--.
Column 7, line 23, delete "(b)" and insert --(h)--.
Column 8, line 30, after "antennas" insert --for coupling the currently selected one of the at least two antennas--.

Signed and Sealed this

Third Day of January, 1995

Attest:

BRUCE LEHMAN

Attesting Officer

Commissioner of Patents and Trademarks